United States Patent [19]

Liang

[11] Patent Number: 4,811,241
[45] Date of Patent: Mar. 7, 1989

[54] CLIPPING OF FIXED CHARACTER STRINGS IN A GRAPHICS SYSTEM

[75] Inventor: Bob C. Liang, West Hurley, N.Y.

[73] Assignee: International Business Machines Corporation, Armonk, N.Y.

[21] Appl. No.: 821,103

[22] Filed: Jan. 21, 1986

[51] Int. Cl.[4] .......................................... G06F 15/626
[52] U.S. Cl. .................................. 364/518; 340/747; 364/521
[58] Field of Search .............................. 364/518, 521; 382/44-46; 340/723, 727, 730, 739, 743, 747

[56] References Cited

U.S. PATENT DOCUMENTS

| | | | |
|---|---|---|---|
| 4,396,989 | 8/1983 | Fleming et al. | 364/521 |
| 4,412,296 | 10/1983 | Taylor | 364/521 |
| 4,481,594 | 11/1984 | Staggs et al. | 364/521 |
| 4,549,275 | 10/1985 | Sukonick | 364/521 |
| 4,682,189 | 7/1987 | Purdy et al. | 364/521 X |

OTHER PUBLICATIONS

Foley et al., *Fundamentals of Interactive Computer Graphics*, pp. 479-485 and 433-435 and 144-153, 1983.

Primary Examiner—Gary V. Harkcom
Assistant Examiner—H. R. Herndon
Attorney, Agent, or Firm—Mark S. Walker; George E. Clark

[57] ABSTRACT

A method for clipping fixed characters against one or more clipping boundaries for display in a graphics display system, includes the steps of: storing fixed characters to be displayed; defining a window in a first coordinate space against which said characters shall be clipped along one or more boundaries thereof; clipping an inverse character box for each fixed character to be displayed against said defined clipping window; and transforming said clipped character box defined in a first coordinate space to a character box defined in a second coordinate space for display on a graphics display system.

5 Claims, 8 Drawing Sheets

FIG. 1
A RASTER GRAPHICS SYSTEM

FIG.6

CLIPPING & MAPPING
OF FIXED CHARACTER

WORLD COORDINATE SPACE

SCREEN

WORLD COORDINATE SPACE

SCREEN

FIG. 7

| CHARACTER PATH ORIENTATION | CHARACTER BOX ORIENTATION | XMOV | YMOV | XBOX | YBOX | XXMOV | YYMOV |
|---|---|---|---|---|---|---|---|
| 0 DEG | 0 DEG | e1 | 0 | e1 | e2 | d1 | 0 |
| 90 DEG | 0 DEG | 0 | e2 | e1 | e2 | 0 | d2 |
| 180 DEG | 0 DEG | -e1 | 0 | e1 | e2 | -d1 | 0 |
| 270 DEG | 0 DEG | 0 | -e2 | e1 | e2 | 0 | -d2 |
| 0 DEG | 90 DEG | e4 | 0 | -e4 | e3 | d2 | 0 |
| 90 DEG | 90 DEG | 0 | e3 | -e4 | e3 | 0 | d1 |
| 180 DEG | 90 DEG | -e4 | 0 | -e4 | e3 | -d2 | 0 |
| 270 DEG | 90 DEG | 0 | -e3 | -e4 | e3 | 0 | -d1 | e1=d1*xratio
e2=d2*yratio
e3=d1*yratio
e4=d2*xratio

FIG. 8a
FLOW CHART

CLIPPING OF FIXED CHARACTER STRINGS IN A GRAPHICS SYSTEM

BACKGROUND OF THE INVENTION

1. Field of the Invention

The present invention relates to information handling systems and more particularly to information handling systems in which method and apparatus are employed to clip fixed character strings against a viewport in a graphics display system.

2. Description of the Prior Art

The following are systems representative of the prior art.

"Fundamentals of Interactive Computer Graphics" by Foley and Van Dam, published by Addison, Wesley Publishing Company, 1982 at pages 152-153 and pages 484-485, discusses generally several techniques for clipping fixed character strings agains a viewport.

More specifically FIGS. 4.10, 4.11, 4.12, show three situations for clipping fixed character strings against the clipping window.

Although the Foley and Van Dam text generally discusses the problem of clipping fixed character strings in a raster graphics display system, the text does not teach nor suggest the implementation as described and claimed herein according to the present invention.

Bresenham in a article entitled "Algorithm for Computer Control of Digital Plotter", IBM System Journal, Vol. 4 Number 1, 1965, at pages 25-30, describes the basic line generating algorithm which is employed in most graphics display systems.

However, the article does not teach the method for transforming and clipping fixed character strings in accordance with the present invention.

Characters for display on a graphics display system can be represented as programmed characters comprised of individual graphic primitives (lines, points, etc.) or as fixed characters which contain a fixed pattern of picture elements (pels) defining that character. Fixed characters are typically defined in terms of the resultant character display size. This creates a problem when a character string to be displayed by a program must be clipped so that it will fit within a viewport or the display monitor. In the prior art, the character string was first mapped from device independent (world) coordinates to display monitor coordinates and then clipping against the viewport window was formed. This frequently led to problems when the device independent coordinates could not be mapped to the display monitor coordinates resulting in a coordinate overflow and error condition.

SUMMARY OF THE INVENTION

It is therefore an object of the present inention to perform character string clipping in a manner that avoids coordinate overflow. In particular, it is an object of the present invention to perform character string clipping in device independent world coordinates prior to mapping to display monitor coordinates Therefore, it is a primary object of the present invention to efficiently transform and clip fixed character strings against a predetermined device independent clipping window by a method including the steps of:

transforming the initial point of a fixed character string to be displayed to a predetermined device independent coordinate location;

clipping a current position of an initial point of said fixed character string against one or more first predetermined clipping boundaries;

testing said current position to determine if said initial point of said fixed character string is inside said first predetermined clipping boundaries;

fetching a character code if said test indicated that said initial point of said fixed character string is within said first clipping boundaries;

testing for end of character data and terminating process if no more character data exists;

clipping said current position against additional predetermined clipping boundaries;

testing to determine if said current position is within said additional clipping boundaries;

testing to determine whether a character box for a current character is within said additional clipping boundaries if said current position is within said additional clipping boundaries;

issuing a draw character order for characters having a character box within said additional clipping boundaries;

updating the current position; and repeating said fetching and testing steps until the end of character data is reached.

It is another object of the present invention to clip fixed character strings against predetermined clipping boundaries as above wherein the first clipping boundaries are Z axis boundaries and the additional clipping boundaries are X and Y axis clipping boundaries which form a two dimensional window.

It is yet another object of the present invention to clip a fixed character string against predetermined clipping boundaries, further including the step of transforming the character string from a first coordinate space having a first set of coordinate boundaries to a second coordinate space having a second set of coordinate boundaries where the second coordinate space is smaller than the first coordinate space.

Accordingly, a method for clipping fixed character strings against predetermined device independent clipping boundaries includes the steps of:

transforming the initial point of a fixed character string to be displayed to a predetermined device independent coordinate location;

clipping a current position of an initial point of said fixed character string against one or more first predetermined clipping boundaries;

testing said current position to determine if said first point of said fixed character string is inside said first predetermined clipping boundaries;

fetching a character code if said test indicated that said initial point of said fixed character string is within said first clipping boundaries;

testing for end of character data and terminating process if no additional character data exists;

clipping said current position against additional predetermined clipping boundaries;

testing to determine if said current position is within said additional clipping boundaries;

testing to determine whether a character box for a current character is within said additional clipping boundaries if said current position is within said additional clipping boundaries;

issuing a draw character order for characters having a character box within said additional clipping boundaries;

updating the current position; and repeating said fetching and testing steps until the end of character data is reached.

The foregoing and other objects, features and advantages of the invention will be apparent from the more particular description of the preferred embodiments of the invention, as illustrated in the accompanying drawing.

BRIEF DESCRIPTION OF THE DRAWING

In the drawings, like elements are designated with similar reference numbers, and identical elements in different specific embodiments are designated by identical reference numbers.

DESCRIPTION OF PREFERRED EMBODIMENTS OF THE INVENTION

A Graphics Display System

A graphics display processor for transforming and clipping characters is discussed here.

Figure 1:
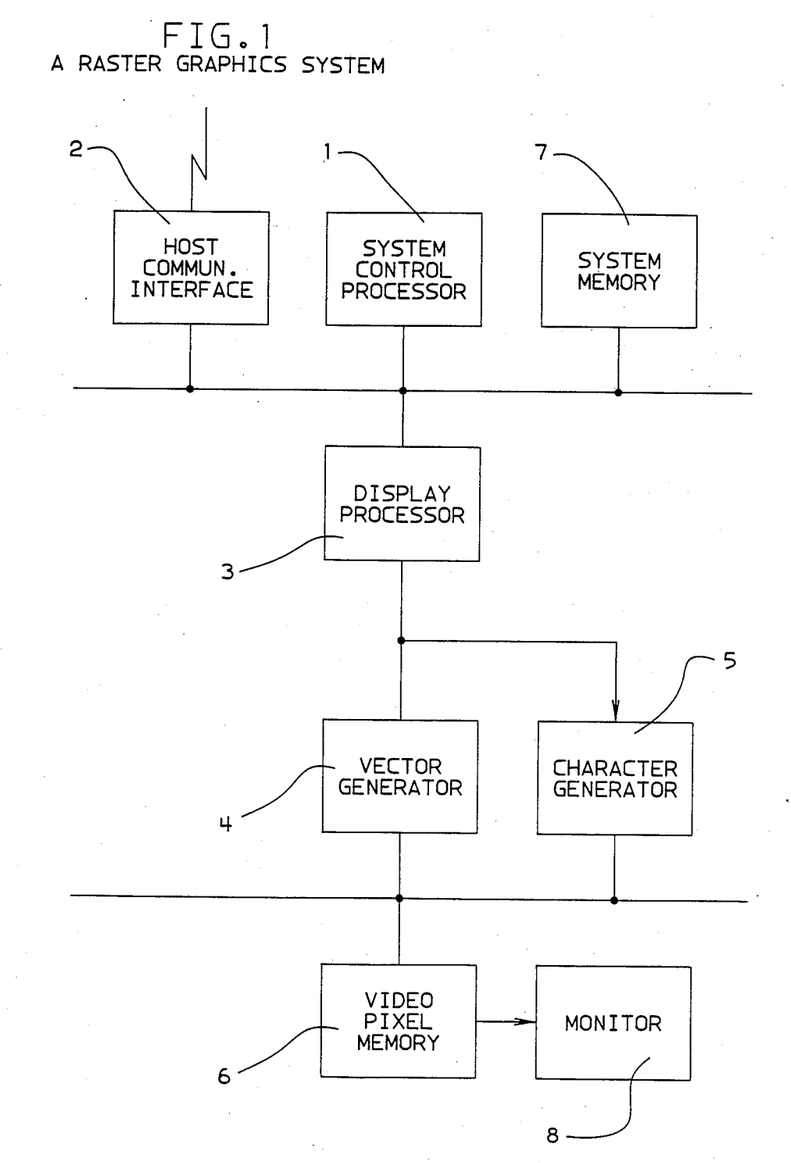
FIG. 1 is a block diagram of a raster graphic system for performing the method according to the present invention.
Figure 2:
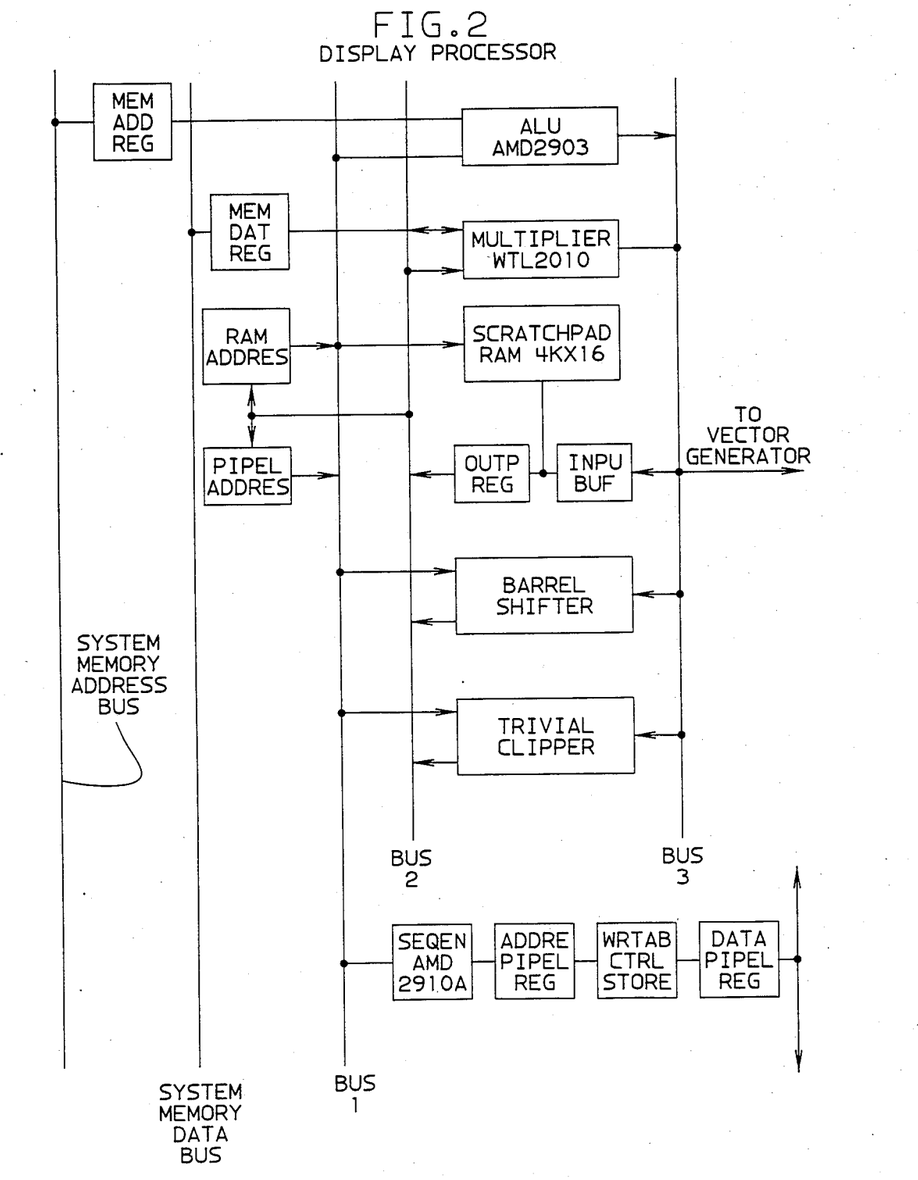
FIG. 2 is a block diagram of a display processor of the system shown in FIG. 1 for performing the method according to the present invention.

The Graphics Display Processor shown in FIG. 2 forms part of a Graphics Raster Display System, shown in FIG. 1.

For geometric primitives, such as vectors (lines), markers, or polygons (or equivalently, the vertices of polygons), the transformation-clipping-mapping process may be executed.

A Raster Graphics System

Consider the raster graphics system in FIG. 1. It consists of the following major components.
1. System Control Processor
2. Host Communication Interface Processor
3. Display Processor
4. Hardware Rasterizer-Vector Generator
5. Hardware Character Generator
6. Video Pixel Memory
7. System Memory
8. Display Monitor

Functions of Major Components

The following is a brief overview of the functions of the major components. It should be noted that each of the major hardware components listed above are known in the prior art and may be implemented by components of a commercially available graphics display system such as the IBM 5080.

1. System Control Processor

The System Processor is a general purpose processor that has maser control of the System. The System Control Processor is responsible for servicing all attached Graphics I/O devices.

Coordinating the associated processing with the Display Processor the System Control Processor interfaces with the host via Host Communication Interface 2. Host Communication Interface The Host Communication Interface provides the serial interface of the System to the host.

3. Display Processor

Referring now to FIG. 2, a Display Processor 3(DP) for performing the method of the present invention will be described.

The Display Processor 3 is responsible for executing graphics orders in the Display Storage Program, residing in the system memory 7 and is concerned mainly with the generation of the image that will appear on the Display Monitor 8. It has the following functions:

Decoding grahics orders and executing non-drawing orders; e.g. book keeping and control.

Performing the transformation and clipping of the geometric primitives: lines, characters, polygons, etc.

Preparing the following geometric objects for display: lines, characters, markers, filled polygons, by preprocessing and feeding the data to the Vector generator 4 and Video Pixel Memory 6

4. Vector generator

Vector generator is a hardware implementation of the Bresenham Line Generating algorithm, which takes the end points of a vector (line) as input, and generates pixels along the vector (line) in the Video Pixel Memory 6 as output for display.

5. Character Generator

This consists of 4 sets of base characters (of 4 different sizes). The Display processor 3 passes the EBCDIC code point to the Character Generator 5, which sends the prestored stroke data (forming the requested character) to the Video Pixel Memory 6 to be displayed at the current position.

6. Video Pixel Memory

Video Pixel Memory 6 consists of eight 1k by 1k bit planes, which supports the display of 256 colors simultaneously via color look-up tables. The image stored in the Vector Pixel Memory 6 will be displayed in the Display Monitor 8.

TRANSFORMATION, CLIPPING, MAPPING PROCESS

Each geometric primitive—vectors, programmable character strokes, and fixed characters —undergoes a transformation, clipping, mapping process prior to being displayed on the Display Monitor 8.

1. The first stage is the transformation of the geometric primitive in the world coordinate space.

This might involve a rotation, translation, scaling, shearing, or a combination of these; and is accomplished by matrix multiplication.

2. The second stage is the clipping of the transformed geometric primitive against a clipping box.

3. The last stage is mapping the clipped data to the viewport in the Display Monitor 8.

The world coordinate space is, for example, a 16-bit space (−32k to 32k in x, y, z directions).

The Clipping Box is a rectangular box defined in the world coordinate space.

The resolution of the screen is, for example, a 10-bit space (1k×1k in x and y); and the viewport is a rectangle on the screen with sides parallel to the x and y axis.

Using a vector (line) as an example, there are three stages:

1. transformation

For the end points of a vector, which is in the 16-bit fixed number format, the matrix multiplication is done in the (−32k,32k-1), 16-bit x, y, and z space.

2. clipping

Using the two end points of a vector (line) and clipping to the clipping box specified by the users. (discard the portion of the line outside of the clipping box).

The computation is done in 16-bit space.

3. mapping

Mapping the contents inside the clipping box (in 3D) or clipping window (in 2D) to a viewport on the Display Monitor 8 specified by the user.

The screen coordinate is (0,4k−1) by (0,4k−1), which then mapped to the 1k by 1k screen.

CHARACTERS IN A GRAPHICS DISPLAY

There are two types of characters supported by the preferred embodiment of the present invention.

1. Fixed Characters
2. Programmable Characters

The Programmable Characters are composed of user-defined strokes, and the Display Processor treats each stroke as individual vector. Each stroke can be transformed, clipped, and mapped to the screen.

Figure 6:
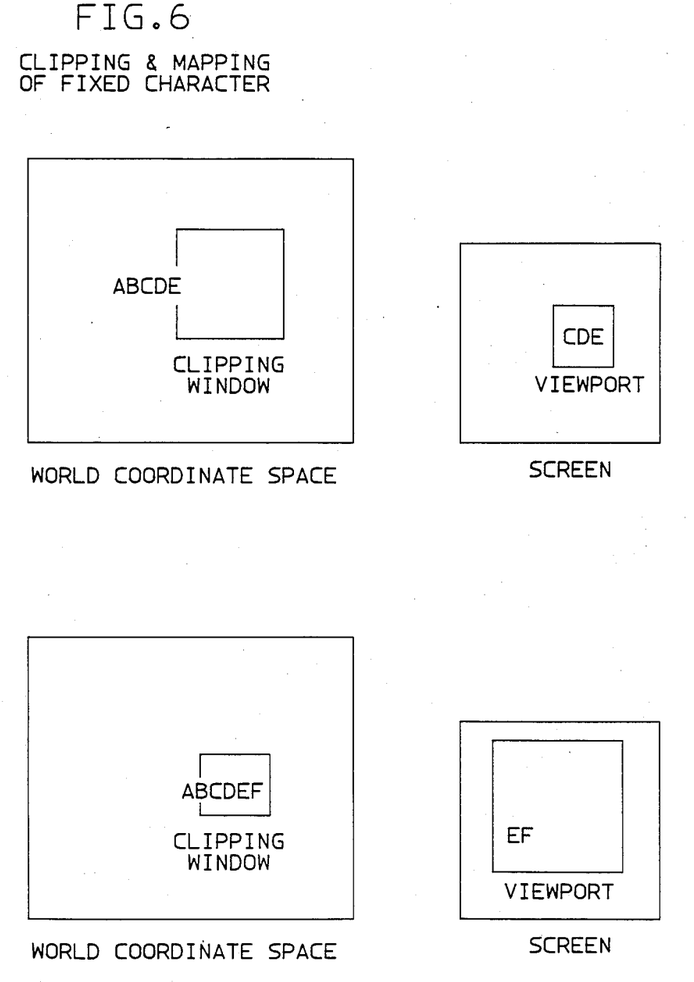
FIG. 6 is a schematic representation of clipping and mapping of fixed characters from a world coordinate space to a viewport on a display screen.

But a Fixed Character string is treated differently:

1. the initial position of the character string can be transformed;
2. each individual character is contained in a character box, which can not be transformed;
3. each character is clipped against the viewport (on the screen) by using the character box—if any part of the box is outside the viewport, then the character is not displayed. (see FIG. 6)

THE LOGICAL DATA FLOW FOR PROCESSING CHARACTERS

Figure 3:
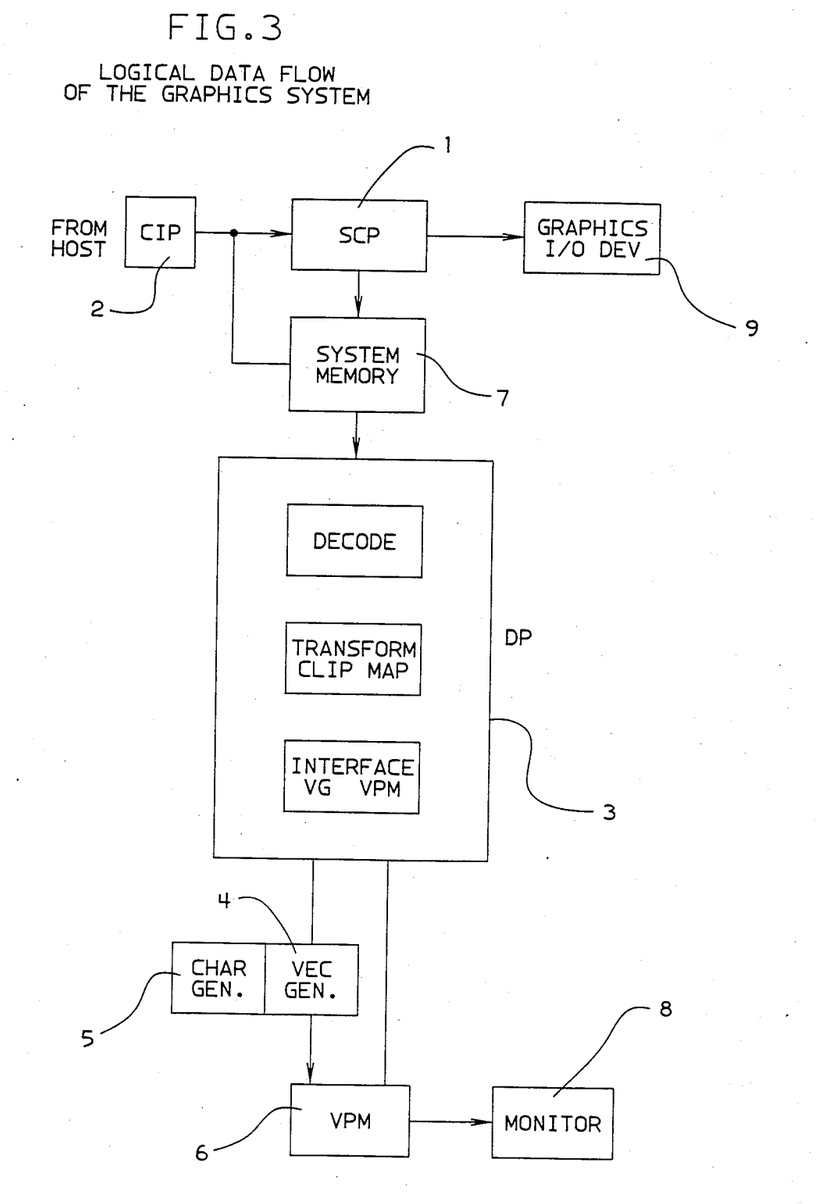
FIG. 3 is a block diagram showing the logical data flow of the raster graphic system of FIG. 1.

The logical data flow of the graphics system is shown in FIG. 3.

1. The Application Program is loaded from the host via the Host Communication Interface 2 to the System Memory 7;
2. The System Control Processor 1 preprocesses the data (depending on the work required), the interrupts the Display Processor 3;
3. The Display Processor 3 then processes the data;
4. The data is then passed to the VPM 6 for display directly or via the Vector generator 4 or the Character Generator 5.

Programmable Characters

The Programmable Characters can be handled in the same way as vectors, because they are composed of strokes.

Figure 4:
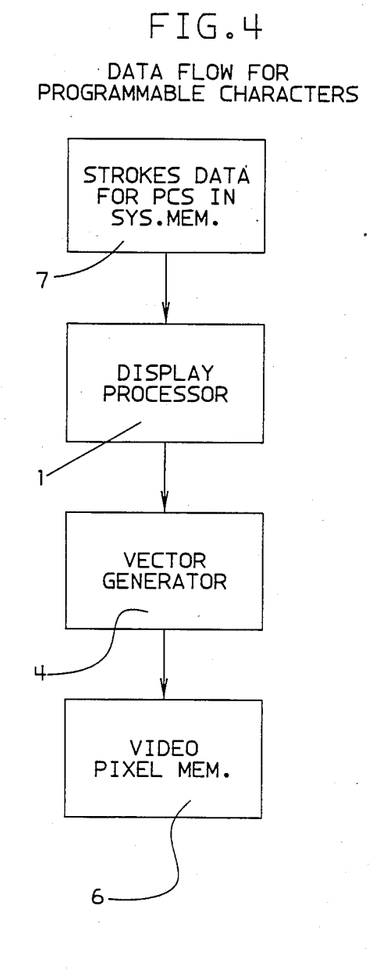
FIG. 4 is a block diagram of the data flow for generation of programmable characters.

The Display Processor 3 fetches the stroke data of the characters, formats the data to a vector format and transforms, clips, and maps each vector. As far as the Vector generator 4 is concerned, it just receives the same data as the Draw Line Orders. See FIG. 4.

Fixed Characters

Figure 5:
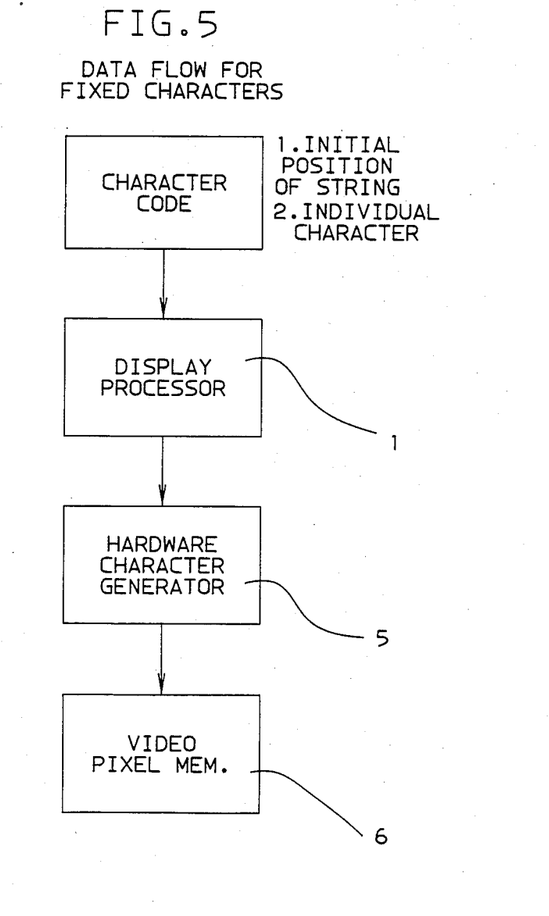
FIG. 5 is a block diagram of the data flow for generation of fixed characters.

The handling of the Fixed Characters is different from the Programmable ones. Each character can not be transformed, but the initial position of a character string can. The clipping applies to the character box containing the character, as a whole, if any part of the character box is outsie the clipping boundary, then the entire character (or marker) is rejected. See FIG. 5.

CHARACTER PATH AND CHARACTER BOX ORIENTATION

Among the attributes associated with the Characters, there are two which affects the position of the character string in display:

1. Character Path Inline Orientation

Character Path Inline Orientation defines the direction for placing the next character on the line with respect to the current character. There are four directions:
   a. Zero degrees, left to right horizontal; default value.
   b. 90 degrees, vertical up.
   c. 180 degrees, right to left horizontal.
   d. 270 degrees, vertical down.

2. Character Box Orientation

Character Box Orientation defines the direction of the rectangle within which the character is drawn with respect to the x-axis of the Display coordinate system. There are two cases:
   a. Zero degree; character box width is parallel to the x-axis and character box height is parallel to the y-axis; default value.
   b. 90 degree; character box width is parallel to the y-axis and character box height is parallel to the x-axis; character box is rotated 90 degrees counter-clockwise.

In the preferred embodiment, these two attributes are determined by the Attribute Register #17 which is an 8-bit register of the form B"iiiirrrr" where:

iiii character inline path orientation with:
   0000=zero degree
   0100=90 degree
   1000=180 degree
   1100=270 degree and, rrrr character box orientation with:
   0000=zero degree
   0100=90 degree

A PROCEDURE FOR CLIPPING FIXED CHARACTER STRING

First, view the Fixed Character in the world coordinate space as the image of the inverse window-to-viewport mapping.

Window-to-viewport mapping is the process by which a vector or character is translated from the device independent world coordinate view to the physical coordinates of the display monitor viewport. Inverse window-to-viewport mapping is the process of defining the boundaries of the physical viewport in terms of the device independent world coordinates. This can be accomplished as described below.

WINDOW-TO-VIEWPORT MAPPING

Assume that the boundary of the clipping window in world coordinates is defined by:
   xclip1, clip2 (left, right)
   yclip1, yclip2 (bottom, top)
   zclip1, zclip2 (near, far)

Each of the above coordinates can assume a value between −32k and 32k−1.

The Display Monitor 8 viewport boundary is defined by xview1, xview2
yview1, yview2,
where each of the above coordinates are between 0 and 4k.

The window-to-viewport ratios in the x and y directions are given by $$wvx = (xview2 - xview1)/(xclip2 - xclip1)$$

$$wvy = (yview2 - yview1)/(yclip2 - yclip1),$$

which are floating point numbers.

After the clipping, a point (x, y) is mapped to a point (xscreen, yscreen) the Display Monitor 8 according to the following following transform $$xscreen \rightarrow (x - xclip1)*wvx + xview1$$

$$yscreen \rightarrow (y - yclip1)*wvy + yview1$$

CLIPPING THE INVERSE IMAGE OF A FIXED CHARACTER

To determine the world coordinates corresponding to the physical viewport, an inverse window-to-viewport mapping must be performed. To do this let xratio, yratio denote the inverses of wvx, wvy respectively.

Let d1 and d2 denote the width and the height of the particular character box being processed (in the physical viewpoint space).

In the preferred embodiment, the size of the character box is provided by the application program via the attribute register 18.

Let e1 and e2 be the width and the height of the box under the inverse window-to-viewport mapping.

That is, the width and height of the inverse character box in world coordinates which can be calculated by:

$$e1 = d1*xratio$$

$$e2 = d2*yratio$$

For character with character box orientation=90 degrees (i.e. the character displayed is rotated 90 degrees from its world coordinate width and height, e3 and e4 would be calculated as:

$$e3 = d1*yratio$$

$$e4 = d2*xratio$$

Assuming the pre-transformed initial position is at (a0,b0,c0), the part of the program to draw the character string 'ABCDEFG' beginning at (a0,b0,c0) is
2A40
C1C2
C3C4
C5C6
where '2A40' is the graphics order for drawing characters in the preferred embodiment; and the C1,C2, etc. are the EBCDIC codes for the characters A, B, etc.

Each Character starts at the lower left corner of the character box.

There are other geometric attributes associated with the fixed characters—character path and character orientation.

Figure 7:
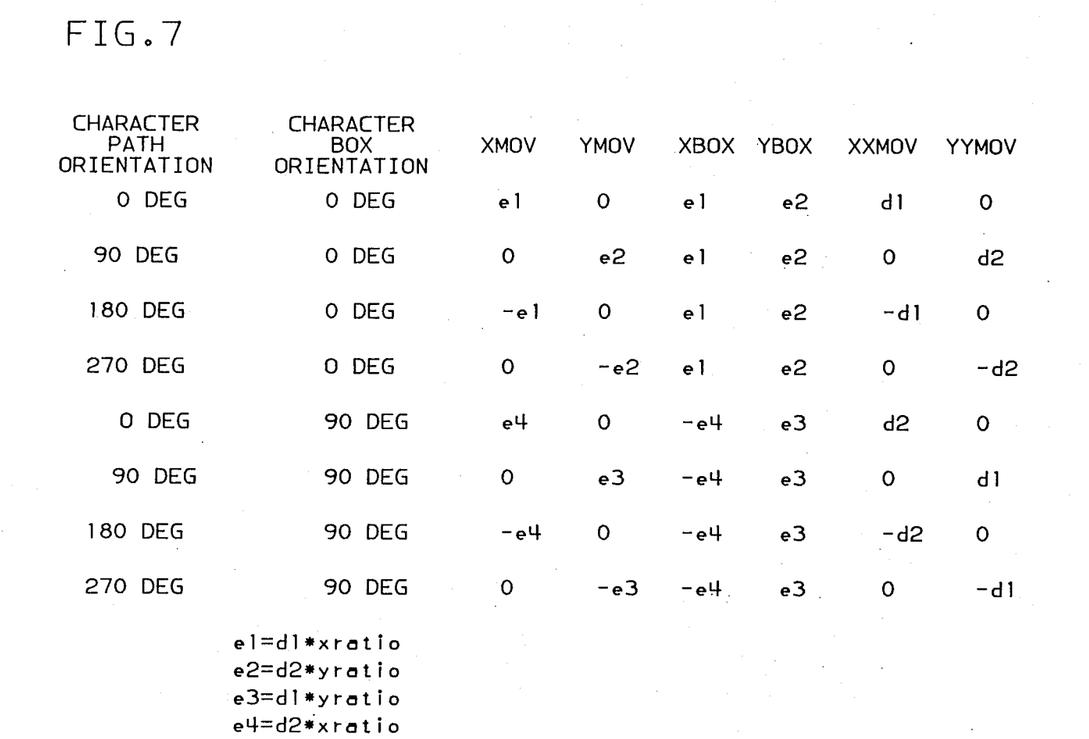
FIG. 7 is a table showing the register contents for combinations of character path and character box orientation.

Six registers are used to store the information needed for handling the character path and orientation—xmov, ymov, xbox, ybox, xxmov, and yymov—see FIG. 7.

PROCEDURE TO DRAW A STRING OF FIXED CHARACTERS

Figure 8A:
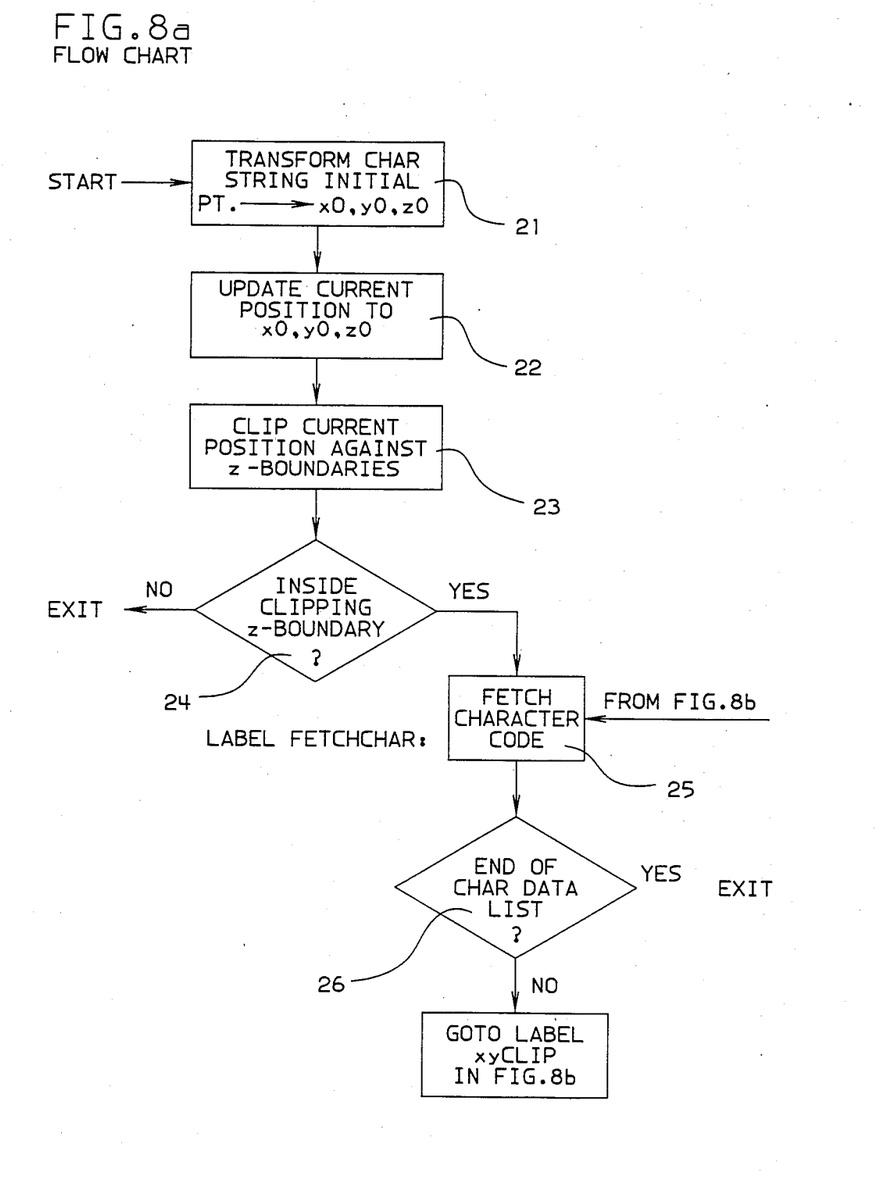
FIGS. 8a and 8b are a flow chart of the method for clipping fixed character strings according to the present invention.
Figure 8B:
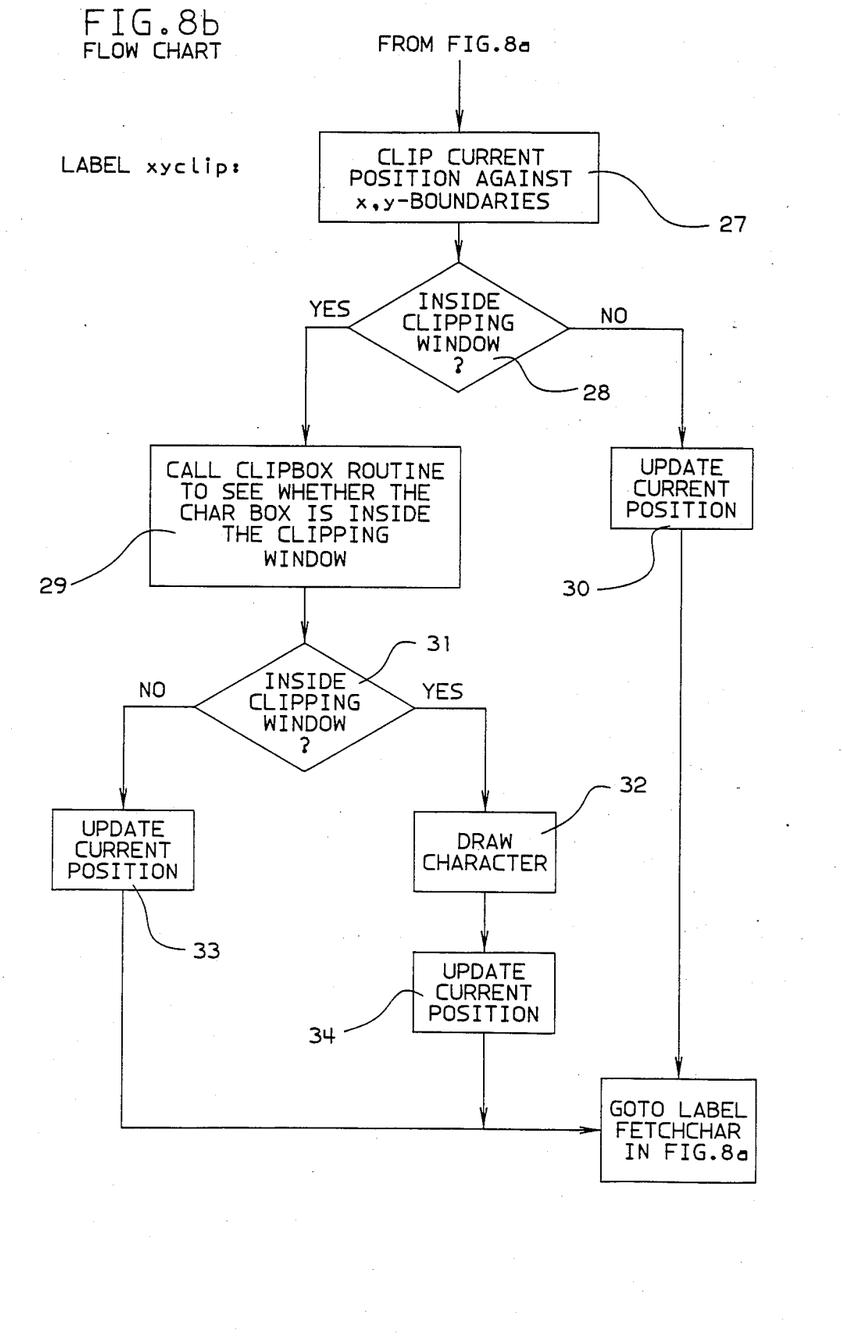

Referring now to FIGS. 8(a) and 8(b) the procedure to draw a character string according to the present invention will be described.

Procedure (Drawing Character)

1. Step 21 transforms the initial world coordinate position (a0,b0,c0) to the new viewpoint position (x0,y0,z0);
2. Step 22 updates the current point position register (x,y,z) to (x0,y0,z0); and calls the clipping subroutine to clip (x,y,z);
3. Clipping against z-clipping boundaries 23

Step 24 determines if the initial point is inside the z-clipping boundary. If the initial point is rejected, then the entire character string is outside the clipping box; and the subroutine exits.
4. Step 25 fetches the fixed character code description corresponding to the character to be displayed. If there are no more characters to be displayed (Step 26) the subroutine exits.
5. CLIPPOINT:

Determine whether the current point is within the clipping windows by comparing (Step 28) the current position against x and y-clipping boundaries.

a. If the current position is accepted, then
   (1) mapping the point (x,y,z) to the screen positions (xscreen, yscreen) by the window-to-viewport mapping as follows:
   (2) CLIPEACH:

Determine whether the entire character box is within the window by calling the box clipping subroutine CLIPBOX(x,y,xbox,ybox) (Step 29) to check whether the character box is inside the clipping window (x,y directions);

if it is inside the clipping window, then the character is drawn (Step 32) at the Display Monitor 8 position (xscreen, yscreen) with given character orientation; and the current point position is updated to (x+xmov, y+ymov,z); the screen position register (xscreen, yscreen) updated (Step 33) to (xscreen+xxmov,yscreen+yymov).

The next character code is fetched (Step 25) and processing continues from there.

if the character box is not completely inside the clipping window, then the character is not drawn. But the current point position is updated to (x+xmov,y+ymov,z); the screen position register (xscreen,yscreen) updated to (xscreen+xxmov,yscreen+yymov). The next character code is fetched (Step 25) and processing continues from there.

b. If the initial point is rejected by x−y clipping, then we update the current point register (x,y,z) by (x+xmov,y+ymov,z) (Step 30); and fetch the next character (Step 25).

The following is an example of a CLIPBOX routine 29 which could be used in the above procedure. Assume that the boundaries of the 2 dimensional clipping window are given by xclip1, xclip2, yclip1, and yclip2; which is contained in XA, XB, YA, and YB below. The character box is bounded by x, y, x+xmov, y+ymov, which will be contained in X1, X2, Y1, Y2 below. (All coordinates are in world space.)

CLIPPING WINDOW   OBJECT EXTENT

One flag will be set depending upon the relative positions of the above two rectangles The goal is to determine whether or not the character box (x1,x2,y1,y2) is entirely within the clipping window.

If the box is inside the window, then the inside flag is set to 1. (This would cause the character to be drawn on the display monitor 8.)

If the box is not completely inside the window, then the inside flag is set to 0. (The character would be "clipped" i.e. not drawn.)

The following is the procedure to check the relative position of a rectangle bounded by a←x←a+b and c←y←c+d against a a rectangle bounded by XA←x-←XB and YA←y←YB.

Program Clipbox (a,b,c,d)

X1=a;
X2=a+c;
Y1=b;
Y2=b+d;
inside flag=1;
If X2−XA<0, goto outside;
If XB−X1<0, goto outside;
If Y2−YA<0, goto outside;
If YB−Y1<0, goto outside;
If X1−XA<0, goto outside;
If XB−X2<0, goto outside;
If Y1−YA<0, goto outside;
If YB−Y2<0, goto outside;
return to calling program
outside: inside_flag=0
return to calling program Thus, while the invention has been described with reference to preferred embodiments thereof, it will be understood by those skilled in the art that various changes in form and details may be made without departing from the scope of the invention.

What is claimed is:

1. A method, for clipping fixed characters against one or more clipping boundaries for display in a graphics display system, comprising the steps of:
   storing fixed characters to be displayed;
   defining a window in a first coordinate space corresponding to a viewport on a graphics display system against which said characters shall be clipped along one or more boundaries thereof;
   determining an inverse character box representing the size of a fixed character character box in said first coordinate space;
   clipping said inverse character box for each fixed character to be displayed against said defined clipping window; and
   transforming said clipped character box defined in a first coordinate space to a character box defined in a second coordinate space for display on a graphics display system.

2. A method for efficiently transforming and clipping fixed character strings against a predetermined device independent clipping window for display on a graphics display system, said method comprising the steps of:
   transforming an initial point of a fixed character string to be displayed to a predetermined device independent coordinate location;
   clipping a current position of said initial point of said fixed character string against one or more first predetermined clipping boundaries;
   testing said current position to determine if said initial point of said fixed character string is inside said first predetermined clipping boundaries;
   fetching a character code if said test indicated that said initial point of said fixed character string is within said first clipping boundaries;
   testing for end of character data terminating process if no more character data exists;
   clipping said current position against additional predetermined clipping boundaries;
   testing to determine if said current position is within said additional clipping boundaries;
   testing to determine whether a character box for a current character is within said additional clipping boundaries if said current position is within said additional clipping boundaries;
   issuing a draw character order to a graphic display system for characters having a character box within said additional clipping boundaries;
   updating the current position; and
   repeating said fetching and testing steps until the end of character data is reached.

3. A method according to claim 2, wherein the first clipping boundaries are Z axis boundaries and the additional clipping boundaries are X and Y axis clipping boundaries which form a clipping window.

4. A method according to claim 2, further including the step of transforming the character string from a first coordinate space having a first set of coordinate boundaries to a second coordinate space having a second set of coordinate boundaries.

5. The method of claim 2, wherein said step of testing to determine whether a character box for a current character is within said additional clipping boundaries comprises:
   transforming device dependent character box coordinates into device independent character box coordinates; and
   testing to determine whether said device independent character box coordinates are within said additional clipping boundaries.

* * * * *